United States Patent
Wang et al.

(10) Patent No.: US 10,113,935 B2
(45) Date of Patent: Oct. 30, 2018

(54) DISTRIBUTED MULTI-CHANNEL COHERENT OPTICAL FIBER SENSING SYSTEM

(71) Applicant: NEC Laboratories America, Inc., Princeton, NJ (US)

(72) Inventors: Ting Wang, West Windsor, NJ (US); Yi Weng, Lafayette, LA (US)

(73) Assignee: NEC Corporation (JP)

( * ) Notice: Subject to any disclaimer, the term of this patent is extended or adjusted under 35 U.S.C. 154(b) by 235 days.

(21) Appl. No.: 14/975,062

(22) Filed: Dec. 18, 2015

(65) Prior Publication Data

US 2016/0202142 A1 Jul. 14, 2016

Related U.S. Application Data

(60) Provisional application No. 62/101,066, filed on Jan. 8, 2015.

(51) Int. Cl.
  *G01N 21/00* (2006.01)
  *G01M 11/00* (2006.01)
  *G02B 6/14* (2006.01)

(52) U.S. Cl.
  CPC .... *G01M 11/3181* (2013.01); *G01M 11/3109* (2013.01); *G01M 11/3172* (2013.01); *G02B 6/14* (2013.01)

(58) Field of Classification Search
  CPC ......... G01M 11/3109; G01M 11/3172; G01M 11/3181; G02B 6/14; G02B 6/0288
  USPC ...................................................... 356/73.1
  See application file for complete search history.

(56) References Cited

U.S. PATENT DOCUMENTS 9,442,246 B2 * 9/2016 Brunet ............... G02B 6/03611

OTHER PUBLICATIONS

Abouraddy, A.F., et al., "Towards multimaterial multifunctional fibres that see, hear, sense and communicate," Nature Materials, vol. 6, May 2007. (pp. 336-347).

Arik, S.O. et al., "MIMO Signal Processing for Mode-Division Multiplexing," IEEE Signal Processing Magazine, vol. 31, No. 2, Mar. 2014. (pp. 25-34).

Cvijetic, N. et al., "Experimental Time and Frequency Domain MIMO Channel Matrix Characterization versus Distance for 6×28Gbaud QPSK Transmission over 40×25km Few Mode Fiber," Optical Fiber Communication Conference, Mar. 2014. (pp. 1-3).

Li, A. et al., "Few-mode fiber multi-parameter sensor with distributed temperature and strain discrimination," Optics Letters, vol. 40, No. 7, Apr. 2015. (pp. 1488-1491).

(Continued)

*Primary Examiner* — Sunghee Y Gray
(74) *Attorney, Agent, or Firm* — Joseph Kolodka

(57) ABSTRACT

A method and system are provided. The method includes converting, using a spatial mode converter, an input signal into a plurality of spatial modes and performing polarization multiplexing and mode multiplexing, using a polarization multiplexer and a mode multiplexer, respectively, on the input signal. The method further includes injecting the input signal into a fiber optic medium. The method additionally includes applying, using at least one spatial filter in each of a forward and a backward direction within the fiber optic medium, the plurality of spatial modes within the fiber optic medium to transmit the input signal and perform distributed fault sensing on the input signal simultaneously.

20 Claims, 4 Drawing Sheets

(56) References Cited

OTHER PUBLICATIONS

Li, A., et al., "Space-Division Multiplexed High-Speed Superchannel Transmission Over Few-Mode Fiber," Journal of Lightwave Technology, vol. 30, No. 24, Dec. 2012. (pp. 3953-3964).
Li, G., "Recent advances in coherent optical communication," Advances in Optics and Photonics, vol. 1, No. 2, Apr. 2009. (pp. 279-307).
Mizuno, Y., et al., "Brillouin scattering in multicore optical fibers for sensing applications," Scientific Reports, Jun. 2015. (pp. 1-9).
Pan, Z. et al., "Investigation of nonlinear effects in few-mode fibers," Photonic Network Communications, Jun. 2015. (pp. 1-11).
Richardson, D.J., "Filing the Light Pipe," Applied Physics, vol. 330, Oct. 2010. (pp. 327-329).
Richardson, D.J., et al., "Space-division multiplexing in optical fibres," Nature Photonics, vol. 7, May 2013. (pp. 354-363).
Weng, Y., et al., "Distributed Temperature and Strain Sensing using Spontaneous Brillouin Scattering in Optical Few-Mode Fibers," OSA Technical Digest, May 2015.
Weng, Y., et al., "Few-Mode Distributed Optical Fiber Sensors," Advanced Photonics, Jul. 2015. (pp. 1-3).
Weng, Y. et al., "Few-Mode Distributed Optical-Fiber Sensors," Optics & Photonics News, Dec. 2015. (p. 59).
Weng, YI. et al., "Single-end simultaneous temperature and strain sensing techniques based on Brillouin optical time domain reflectometry in few-mode fibers," Opt. Express, Apr. 2015. (pp. 1-6).
Winzer, P.J., "Making spatial multiplexing a reality," Nature Photonics, vol. 8, May 2014. (pp. 345-348).
Winzer, P.J. et al., "MIMO capacities and outage probabilities in spatially multiplexed optical transport systems," Optics Express, vol. 19, No. 17, Aug. 2011 (pp. 1-17).
Xia, C., et al., "Supermodes for optical transmission," Optics Express, vol. 19, No. 17, Aug. 2011. (pp. 1-17).
Yaman, F. et al., "Long distance transmission in few-mode fibers," Optics Express, vol. 18, No. 12, Jun. 2010. (pp. 1-8).

* cited by examiner

DISTRIBUTED MULTI-CHANNEL COHERENT OPTICAL FIBER SENSING SYSTEM

BACKGROUND

Technical Field

The present invention relates to optical fiber systems and, in particular, to a duo-functionality optical fiber sensor system.

Description of the Related Art

Optical fiber technology is ideal for telecommunication systems for its low-loss, high-bandwidth, low-dispersion advantages, as well as its immunity to Electromagnetic Interference (EMI). Optical components, such as optical isolators and optical diodes, are usually applied in fiber-optic communication systems and allow the transmission of light in only the forward direction. This is done to prevent unwanted feedback into the optical oscillator. Additionally, an optical fiber sensor system is another significant application of optical fiber technology thanks to its low-cost, its superior sensitivity, its light-weight technology, its electrical-safety, its remote-access, and its ease of being able to be multiplexed.

So far, numerous distributed sensors using Single-Mode Fibers (SMFs) have been applied in a variety of important fields, such as structural sensing, smart structures, and civil engineering; aerospace and security; marine, oil and gas; and health monitoring. Such fiber optic sensor technology, such as Optical Time Domain Reflectometry (OTDR), mainly depends on measuring the frequency shift or power intensity of Brillouin or Raman scattering light in only the backward direction. Meanwhile, passive components, such as optic terminators, are applied to absorb light coming from the unwanted forward direction. Nonetheless, the optical couplers (optical isolators and optic terminators) in both cases reduce the optical power of forward signal or back reflection, wasting the precious carried information along with it. Little research has been done on the sensor systems that can simultaneously take full advantage of both forward and backward propagating signals in the fiber with high spectral efficiency and low coupling loss.

For particular applications, fiber optic sensors are likely deployed in various harsh environments, such as in dry deserts, on the ocean floor for seismic sensing, or in downhole environments for oil and gas exploration and production. This may create big challenges in the establishment of a long-term, high-speed, and stable communication method between sensing edges and receiver terminals. The implementation of an extra special communication cable will be time consuming, costly, and even technically impossible, for some cases. Moreover, this could add additional maintenance costs for the entire sensing system. So far, there is no mature research that can achieve such duo-functionality, such as signal transmission and distributed sensing, simultaneously within the same fiber. This simultaneous signal transmission and distributed sensing would be of great importance for sensing in sophisticated target environments.

Another main challenge related to optical fiber sensor systems is how to measure and separate a large number of different measurands, which is a challenge that requires the use of many electronic point sensors. The most common functions are temperature and strain/stress sensing. However, a variety of other parameters, such as pressure, magnetic field, rotation and acceleration, voltage, and chemical species might also be measured. So far, one particular type of sensor typically corresponds to one measurand, but there are exceptions. SMFs, the Brillouin frequency shift, and the Brillouin power change were measured to achieve concurrent temperature and strain sensing, but the spatial resolution was too poor. Therefore, there is a need for new optical fiber sensor systems capable of both highly enhanced spatial resolution and accurate, simultaneous measurements of a large number of different measurands.

SUMMARY

A method is provided. The method includes converting, using a spatial mode converter, an input signal into a plurality of spatial modes and performing polarization multiplexing and mode multiplexing, using a polarization multiplexer and a mode multiplexer, respectively, on the input signal. The method further includes injecting the input signal into a fiber optic medium. The method additionally includes applying, using at least one spatial filter in each of a forward and a backward direction within the fiber optic medium, the plurality of spatial modes within the fiber optic medium to transmit the input signal and perform distributed fault sensing on the input signal simultaneously.

A duo-functionality sensor system for a guiding fiber optic medium is provided. The system includes a spatial mode converter configured to convert an input signal into a plurality of spatial modes. The system further includes a polarization multiplexer configured to polarization multiplex the input signal and a mode multiplexer configured to mode multiplex the input signal. The system additionally includes at least one spatial filter for configuring a forward propagating signal for transmission over the fiber optic medium, and at least one spatial filter for performing distributed fault sensing on the input signal based on a backscatter of the input signal, wherein each of the at least one spatial filter is further configured to apply the plurality of spatial modes within the fiber optic medium to transmit the input signal and perform distributed fault sensing on the input signal simultaneously.

These and other features and advantages will become apparent from the following detailed description of illustrative embodiments thereof, which is to be read in connection with the accompanying drawings.

BRIEF DESCRIPTION OF THE DRAWINGS

This disclosure will provide details in the following description of preferred embodiments with reference to the following figures wherein.

DETAILED DESCRIPTION OF PREFERRED EMBODIMENTS

Figure 1:
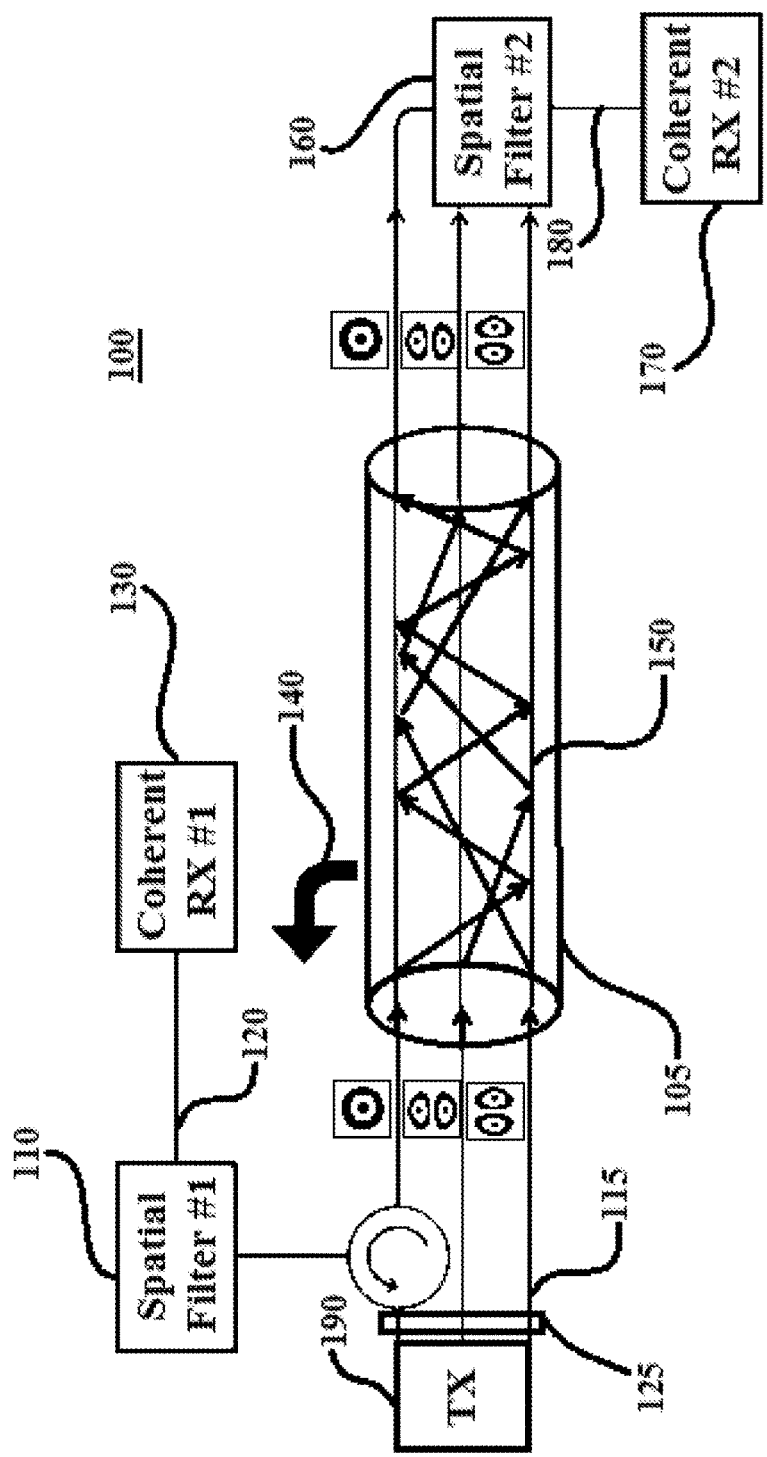
FIG. 1 is a schematic of a duo-functionality sensor system 100 for transmission and distributed sensing, in accordance with an embodiment of the present principles.

In accordance with an embodiment of the present principles, systems and methods are provided for simultaneously achieving telecommunications and distributed sensing, using Few-Mode Fibers (FMFs) or Multi-Mode Fibers (MMFs), special filters, coherent detection, and Multiple-Input and Multiple-Output Digital Signal Processing (MIMO-DSP), by employing a distributed multi-channel coherent optical fiber sensing system. By using a correlation between modes, the system is able to take full advantage of both forward signals and backward signals. This provides cost savings for maintenance and the placement of an extra special communication cable, which is a cable that is configured to allow simultaneous signal transmission and distributed sensing.

No attempt has been made to realize duo-functionality in optical fiber sensor systems because Single-Mode Fibers (SMFs) are not suitable to simultaneously achieve sensing and transmission. In a conventional single-mode fiber (SMF), a fiber supports the propagation of only one spatial mode in two polarizations. When the core radius and core-cladding index difference becomes sufficiently large, a fiber can support multiple spatial modes, and is called an MMF or an FMF, depending on the number of modes the fiber can actually support. Mathematically, the modes are solutions for a wave equation describing the propagation of light, including spatial modes transverse to the direction of propagation (cross-section and divergence) and temporal modes in the direction of propagation (time and frequency).

The energy throughput of an optical system depends on the number of supported modes and the adaptation of the modes between the different sections of the system in both sensing and communication.

Compared with MMFs, SMFs have smaller core diameters and thus need relatively lower input power. Due to the use of SMFs, state-of-the-art systems can have attenuation on the order of 0.1 dB/km. Contrary to this, a faster response time or better resolution might be achieved with higher input power for fiber optic sensors. This is due to the higher backward scattered power carrying sensing data. This will, however, most likely lead to forward signal degradation due to nonlinear effects, such as modulation instability. To avoid signal degradation, SMFs are either used for data transmission in forward propagation or for optical sensing in backward propagation. Forward and backward pumping is merely used for a ring-cavity-based erbium-doped fiber laser. A fiber optic system with duo-functionality, particularly with a combination of transmission and sensing, has not heretofore been available.

Up to now, multiple data channels have been able to be combined with Time Division Multiplexing (TDM), Wavelength Division Multiplexing (WDM), and Spatial Division Multiplexing (SDM) techniques for purely transmission purposes; not for simultaneous transmission and sensing purposes. Particularly, Mode Division Multiplexing (MDM), using FMFs, is emerging as a promising approach to increase the capacity of SMFs for the next generation of optical networks, which shows the possibility that the coupling between the propagating modes of the FMFs enable separation and measurement of the properties of the light in each mode, independently, with the help of MIMO-DSP in coherent transmission systems. Despite these advantages, most currently deployed optical fiber sensor systems are still using SMFs, instead of MMFs or FMFs, due to their existing state of development.

To resolve the above-mentioned problems, the use of a distributed multi-channel coherent optical fiber sensing system is presented, in accordance with an embodiment of the present principles, wherein different groups of propagating modes, using MIMO-DSP, are coupled with high coupling efficiency and low loss and separated for simultaneous transmission and sensing purposes. This is due to their multiplexing capabilities and immunity to electromagnetic interference.

Referring to the drawings in which like numerals represent the same or similar elements and initially to FIG. 1, duo-functionality sensor system 100, for transmission and distributed sensing, is shown.

According to an embodiment of the present principles, an improved optical fiber sensor system 100 is disclosed that can simultaneously take the full advantage of both a forward propagating signal 150 and a backward scattered optical signal 140 in the fiber 105 for active measurements with high sensitivity, low coupling loss, and multi-functionality, without compromising the intrinsic advantages of fiber-optic sensors. In an embodiment, a step-index FMF or MMF 105 carries light in two or more groups of spatial modes. In another embodiment, higher and lower order modes are separated and injected into two opposite directions for signal transmission and energy delivery independently.

In an embodiment, a transmitter 190 launches a number of signals 115 using an optical medium. According to an embodiment, the optical medium is a laser. Once the signal 115 is launched, it is converted into a number of different spatial modes using a spatial mode converter 125. Once the signal 115 is converted into these spatial modes, the signal 115 experiences mode multiplexing, using a mode multiplexer, followed by polarization multiplexing, using a polarization multiplexer. After these two multiplexing steps, the signal 115 is injected into the fiber.

Fiber optic applications typically employ a backscattering method to detect optical faults. Backward optical sensing begins in the system 100 when light is backscattered 140 in the fiber 105. The backscattered light 140 is first polarization de-multiplexed, using a polarization de-multiplexer, in order to separate the signal 140 into its various polarized components. Once the signal 140 is polarization de-multiplexed, it is mode de-multiplexed, using a mode de-multiplexer, into the various spatial modes. After these de-multiplexing steps, the signal passes through a spatial filter 110 or mode selector. This spatial filter 110 or mode selector is designed with the Fourier transform property of a graded index (GRIN) lens, in combination with a pinhole element, to block further propagation of higher order modes and is described in more detail in FIG. 2. In an embodiment, only one mode 120 passes through the spatial filter 110.

After the signal 140 passes through the spatial filter 110 or mode selector, the signal 140 is received by a coherent receiver 130, where the signal experiences MIMO-DSP and sensing analysis is performed.

Forward transmission is very similar to backward optical sensing and begins in the system 100 when the signal 115 launched from the transmitter 190 passes through the fiber 105 in the forward direction. This forward progressing signal 150 is first polarization de-multiplexed in order to separate the signal 150 into its various polarized components. Once the signal 150 is polarization de-multiplexed, it is mode de-multiplexed into the various spatial modes. After these de-multiplexing steps, the signal passes through a spatial filter 160 or mode selector. This spatial filter 160 or mode selector is designed with the Fourier transform property of a graded index (GRIN) lens, in combination with a pinhole element, to block further propagation of higher order modes. In an embodiment, only one mode 180 passes through the spatial filter 170.

After the signal 140 passes through the spatial filter 110 or mode selector, the signal 140 is received by a coherent receiver 130, where the signal experiences MIMO-DSP and sensing analysis is performed.

In an embodiment, optical sensing is achieved in the fundamental mode. In another embodiment, while optical sensing is achieved in the fundamental mode, the previously unoccupied modes are filtered and injected for data transmission purposes. In another embodiment, the system is designed such that the majority of the light from the input fiber is directed to sensing, which requires high power, while the remaining light is used for low data rate transmission. This new sensor system may provide two or more substantially equal intensity optical signals which propagate in different spatial modes. These optical signals may also have different signal power intensity.

In an embodiment, the positional information is recovered by measuring the time delay between an emitted optical pulse and its received back-scattered signal. The processed output signal is responsive to the environmental physical changes or mechanical signal inputs, such as temperature, strain/stress, pressure, rotation, and acceleration, with high resolution and spatial sensitivity. Coherent detection is necessary for detecting light, which propagates with lower and higher order modes, wherein GRIN lenses may be used together with phase masks. This is simple in design and lends ease of fabrication to such systems. The noise background can be significantly reduced due to MIMO-DSP.

Figure 2:
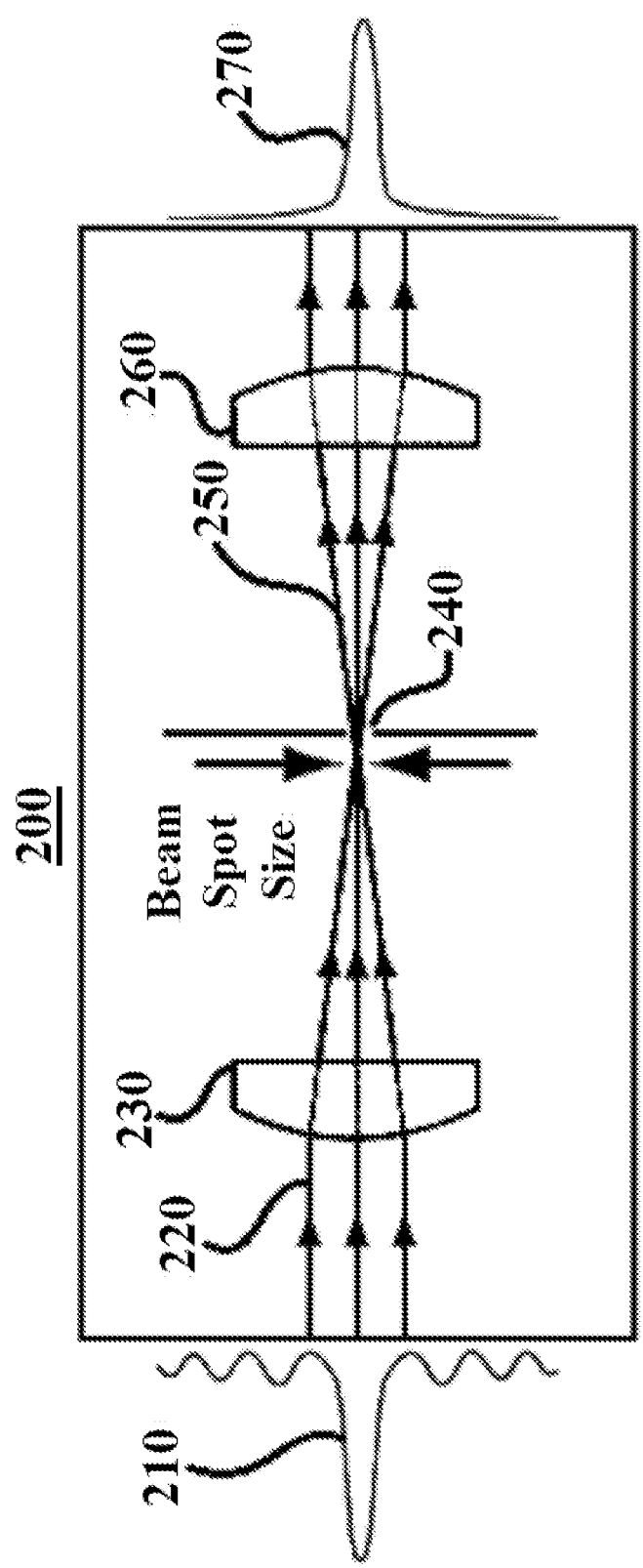
FIG. 2 is a schematic of a spatial filter 200 to extract different spatial modes from input beams, in accordance with an embodiment of the present principles.

Referring to FIG. 2, a schematic of a spatial filter 200 to extract different spatial modes from input beams 220 is shown.

In an embodiment, a beam intensity distribution 210 impacts the spatial filter 200, which allows an input Gaussian beam 220 to pass through. The input Gaussian beam 230 proceeds to pass through an aspheric lens to focus the beam 220 to form a beam spot at the intersection of the separate light waves. The beam 220 proceeds to pass through a pinhole aperture 240, exiting through the aperture 240 as a clean Gaussian beam 250. After a subsequent pass through a collimating lens 260, the beam exits the spatial filter as an output Gaussian profile 270.

According to an embodiment of the present principles, an optical FMF is presented, which supports the propagation and transmission of up to 12 spatial and polarization modes by using $LP_{01}$, $LP_{11}$, $LP_{21}$, and $LP_{02}$ modes. Since an FMF (or MMF) has a larger core diameter and thus a higher light-gathering capacity, more input power is able to launch into the fiber, providing better resolution and sensitivity for optical sensing than SMF. The sensing fiber comprises a cladding diameter $\geq 125$ μm, a coating diameter $\geq 240$ μm, and an effective area between 200 μm² $\leq A_{eff} \leq 320$ μm². The sensing fiber usually has a loss coefficient $\alpha \leq 0.20$ dB/km. In some embodiments, the loss value can be further reduced to 0.16 dB/km through careful design. The cutoff wavelength for the $LP_{11}$ mode is 2000 nm $\leq \lambda_{CF\_LP11} \leq \lambda_{CF\_LP02} \leq 2850$ nm, while the cutoff wavelength for the $LP_{11}$ mode is 2500 nm $\leq \lambda_{CF\_LP11} \leq 3500$ nm. Light propagating in different groups of modes, particularly higher and lower order spatial modes, can be separated using spatial filters or mode selectors, such as a photonic lantern, which is further coupled to a photo detection for measuring and separating a large number of different measurands in each mode independently. The size or shape of the FMF core might vary in order to better suit particular applications.

Figure 3:
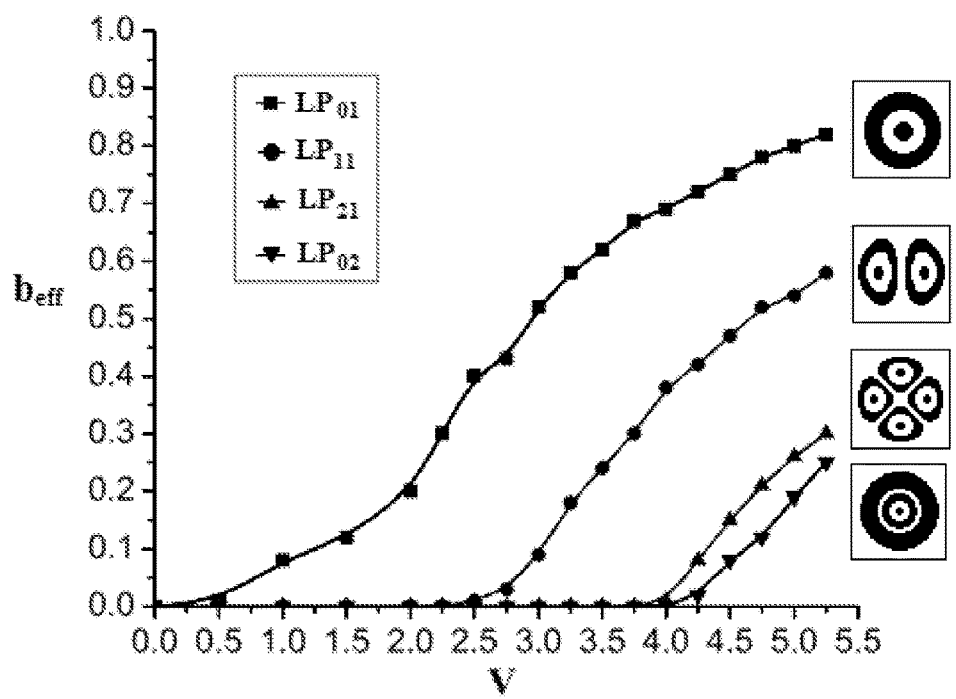
FIG. 3 is a graph of a normalized propagation constant, $b_{eff}$, vs. a normalized frequency, V, for four lightpath modes, in accordance with an embodiment of the present principles.
Figure 4:
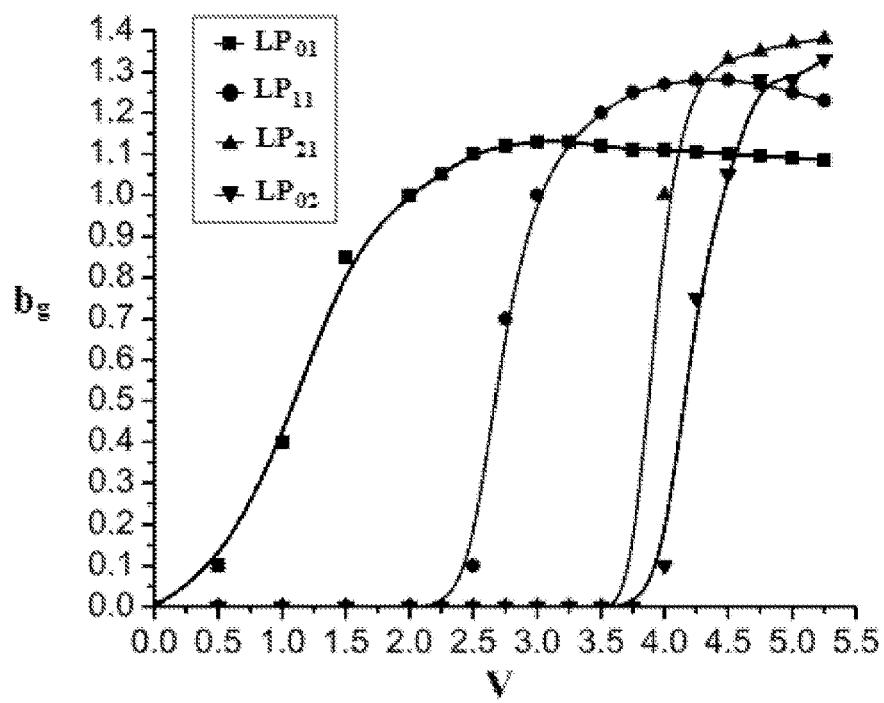
FIG. 4 is a graph of a normalized group delay, $b_g$, vs. a normalized frequency, V, for four lightpath modes, in accordance with an embodiment of the present principles.

Graphical representations of the LP modes, according to embodiments of the present principles, are shown in FIGS. 3-4. Referring to FIG. 3, a graph of a normalized propagation constant, $b_{eff}$, vs. a normalized frequency, V, for four lightpath (LP) modes, is shown. The normalized propagation constant, $b_{eff}$, determines the dispersion properties of different fiber modes.

Referring to FIG. 4, a graph of a normalized group delay, $b_g$, vs. a normalized frequency, V, for four LP modes, is shown. Through this graphical model, it can be known which mode groups have identical effective indices and group indices, and which groups do not necessarily follow that in an effective index. This provides theoretical guidelines for mode selection of the signal transmission plus the distributed sensing duo-functionality.

Figure 5:
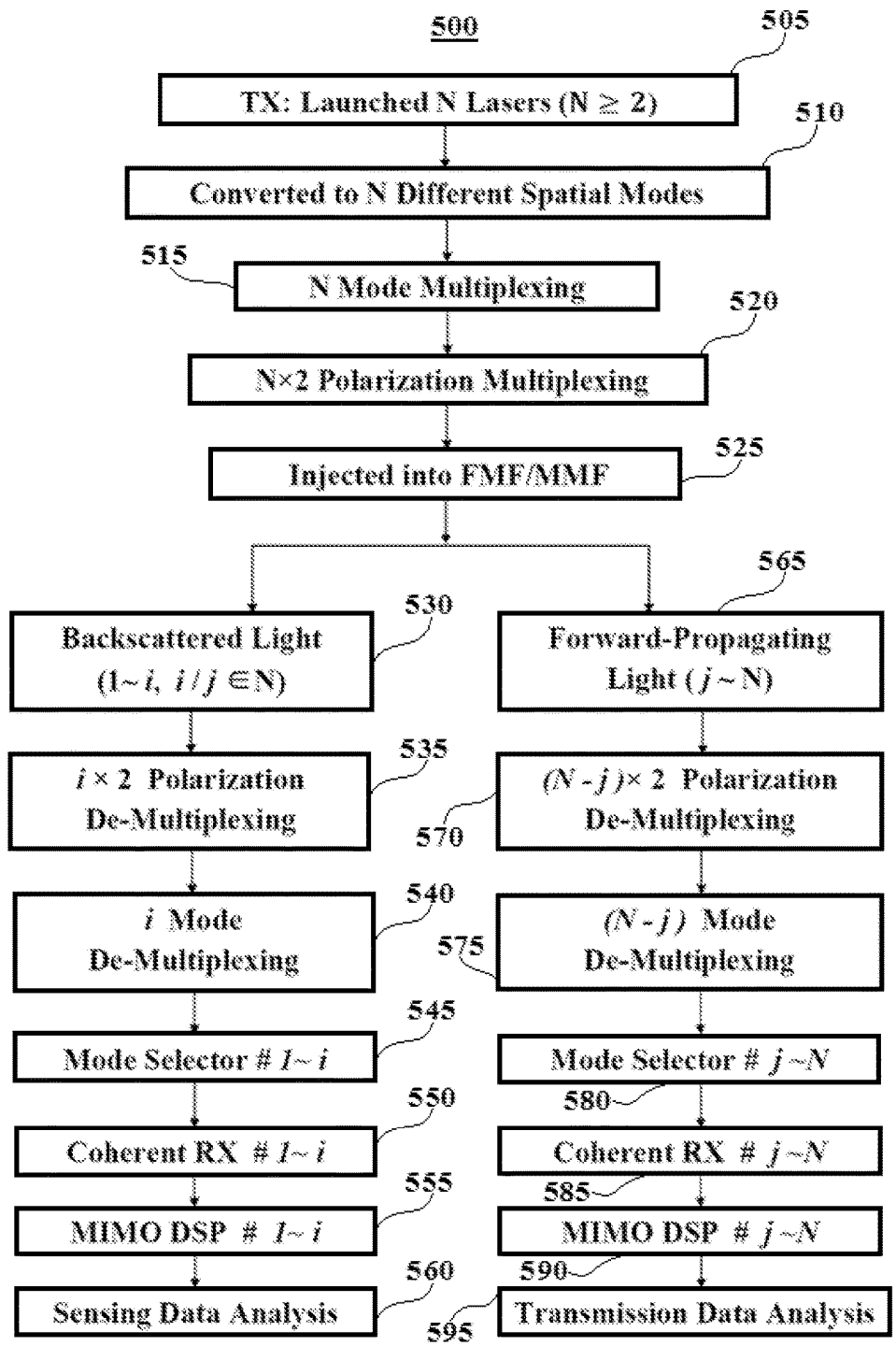
FIG. 5 is a flowchart showing a process 500 of a distributed multi-channel coherent optical fiber sensing system 100, in accordance with an embodiment of the present principles.

Referring to FIG. 5, a flowchart is shown of a process 500 of a distributed multi-channel coherent optical fiber sensing system, in accordance with the present principles.

At step 505, a transmitter launches N number of signals using an optical medium. In an embodiment, the optical medium is a laser. In an embodiment, N is an integer that is larger than or equal to 2. In an embodiment, the total number of channels in the system is equal to twice N.

At step 510, the transmitted N number of signals are converted to N different types of spatial modes. Subsequently, the N number of signals are multiplexed using N mode multiplexing at step 515, followed by the N number of signals being N×2 polarization multiplexed at step 520.

At step 525, the N number of signals are injected into an FMF or an MMF. Once the N number of signals are injected into the FMF or MMF, backward optical sensing and forward data transmission can be performed. For the purposes of backward optical sensing and forward data transmission, i and j are integers larger than or equal to 1 and represent the number of spatial modes used for backward optical sensing or forward data transmission. In an embodiment, i and j are equal and are both smaller than N. In another embodiment, i and j are either not equal or are both not smaller than N. In this latter embodiment, some modes remain relatively dark and get filtered out or may be used for a third functionality, such as in optical fiber medical treatment.

Backward optical sensing begins at step 530. At step 530, the light is backscattered. Thereafter, at step 535, (i×2) polarization de-multiplexing is performed on the N number of signals, followed by i mode de-multiplexing, at step 540.

At step 545, mode selectors or spatial filters are used. These mode selectors or spatial filters are designed with the Fourier transform property of a GRIN lens, in combination with a pinhole element, to block further propagation of higher order modes. The energy throughput of an optical system depends on the number of supported modes and the adaptation of the modes between the different sections of the system in both sensing and communication. "Higher order" modes refer to spatial modes other than the fundamental modes $LP_{01}$.

Different spatial modes propagate with different phase and group velocities. In fibers of a circular cross section, in the limit of weak guidance, the total number of propagating modes can be assumes to have a value D=2, 6, 10, 12, 16, 20, 24, 30, etc. For a typical FMF supporting less than 12 modes, the "higher order" modes could refer to $LP_{11}$, $LP_{21}$, $LP_{02}$, etc. If there are too many modes co-existing along the same optical path, it might introduce mode coupling effects and mode-dependent loss, thus causing signal distortion and performance degradation. To resolve these issues, before the receiver-side, in each of a forward and a backward direction, the desirable mode containing valuable information will be preserved, while the rest of the undesired "higher order" modes would be filtered out thru passive optical elements such as lenses, mirrors, and filters in Spatial Light Modulators (SLM).

At step 550, the N number of signals are received by a coherent receiver. Once the N number of signals are received, MIMO-DSP is performed, at step 555, employing a distributed multi-channel coherent optical fiber sensing system. Thereafter, at step 560, sensing data is analyzed.

Forward data transmission begins at step 565. At step 565, light is forward-propagated. Thereafter, at step 570, [(N−j)× 2] polarization de-multiplexing is performed on the N number of signals, followed by (N−j) mode de-multiplexing, at step 575.

At step 580, mode selectors or spatial filters are used. These mode selectors or spatial filters are designed with the Fourier transform property of a GRIN lens, in combination with a pinhole element, to block further propagation of higher order modes.

At step 585, the N number of signals are received by a coherent receiver. Once the N number of signals are received, MIMO-DSP is performed, at step 590, employing a distributed multi-channel coherent optical fiber sensing system. Thereafter, at step 595, sensing data is analyzed.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method, comprising:
   converting, using a spatial mode converter, an input signal into a plurality of spatial modes;
   performing polarization multiplexing and spatial mode multiplexing, using a polarization multiplexer and a spatial mode multiplexer, respectively, on the input signal;
   injecting the input signal into a fiber optic medium; and
   applying, using at least one spatial filter in a forward direction and at least one spatial filter in a backward direction within the fiber optic medium, the plurality of spatial modes within the fiber optic medium to transmit the input signal and perform distributed fault sensing on the input signal.

2. The method of claim 1, wherein the fiber optic medium is one of a few-mode fiber and a multi-mode fiber.

3. The method of claim 1, wherein the at least one spatial filters in each of a forward and a backward direction are configured to use a Fourier transform property of a graded index, in conjunction with a pinhole element, to block propagation of higher order modes.

4. The method of claim 3, further comprising:
   polarization de-multiplexing a backscattered signal and a forward propagating signal within the fiber optic medium; and
   mode de-multiplexing the backscattered signal and the forward propagating signal within the fiber optic medium.

5. The method of claim 4, further comprising filtering the spatial modes within the backscattered signal.

6. The method of claim 5, further comprising:
   receiving, using a coherent receiver, the backscattered signal; and
   applying multiple-input and multiple-output digital signal processing algorithms to separate different measurands within the backscattered signal.

7. The method of claim 4, further comprising filtering the spatial modes within the forward propagating signal.

8. The method of claim 7, further comprising:
   receiving, using a coherent receiver, the forward propagating signal; and
   applying multiple-input and multiple-output digital signal processing algorithms to separate different measurands within the forward propagating signal.

9. A duo-functionality sensor system for a fiber optic medium, comprising:
   a spatial mode converter configured to convert an input signal into a plurality of spatial modes;
   a polarization multiplexer configured to polarization multiplex the input signal and a spatial mode multiplexer configured to spatial mode multiplex the input signal;
   at least one spatial filter for configuring a forward propagating signal for transmission over the fiber optic medium; and
   at least one additional spatial filter for performing distributed fault sensing on the input signal based on a backscatter of the input signal;
   wherein the at least one spatial filter and the at least one additional spatial filter are further configured to apply, using the at least one spatial filter in a forward direction and the at least one additional spatial filter in a backward direction within the fiber optic medium, the plurality of spatial modes within the fiber optic medium to transmit the input signal and perform distributed fault sensing on the input signal.

10. The duo-functionality sensor system of claim 9, wherein the fiber optic medium is one of a few-mode fiber and a multi-mode fiber.

11. The duo-functionality sensor system of claim 9, wherein the at least one spatial filter configured to receive the forward propagating signal and the at least one spatial filter configured to receive the backscattered signal are configured to use a Fourier transform property of a graded index, in conjunction with a pinhole element, to block propagation of higher order modes.

12. The duo-functionality sensor system of claim 11, further comprising:
a polarization de-multiplexer configured to polarization de-multiplex a backscattered signal and a forward propagating signal within the fiber optic medium; and
a mode de-multiplexer configured to mode de-multiplex the backscattered signal and the forward propagating signal within the fiber optic medium.

13. The duo-functionality sensor system of claim 12, further comprising:
a coherent receiver configured to receive the backscattered signal; and
a multiple-input and multiple-output digital signal processor configured to apply multiple-input and multiple-output digital signal processing algorithms to separate different measurands within the backscattered signal.

14. The duo-functionality sensor system of claim 12, further comprising:
a coherent receiver configured to receive the forward propagating signal; and
a multiple-input and multiple-output digital signal processor configured to apply multiple-input and multiple-output digital signal processing algorithms to separate different measurands within the forward propagating signal.

15. A non-transitory computer-readable storage medium including a computer-readable program, wherein the computer-readable program, when executed on a computer, causes the computer to perform the steps of:
converting, using a spatial mode converter, an input signal into a plurality of spatial modes;
performing polarization multiplexing and spatial mode multiplexing, using a polarization multiplexer and a spatial mode multiplexer, respectively, on the input signal;
injecting the input signal into a fiber optic medium; and
applying, using at least one spatial filter in a forward direction and at least one spatial filter in a backward direction within the fiber optic medium, the plurality of spatial modes within the fiber optic medium to transmit the input signal and perform distributed fault sensing on the input signal.

16. The non-transitory computer-readable storage medium of claim 15, wherein the fiber optic medium is one of a few-mode fiber and a multi-mode fiber.

17. The non-transitory computer-readable storage medium of claim 15, wherein the spatial filters are configured to use a Fourier transform property of a graded index, in conjunction with a pinhole element, to block propagation of higher order modes.

18. The non-transitory computer-readable storage medium of claim 17, wherein the computer-readable program, when executed on a computer, is further configured to cause the computer to perform the steps of:
polarization de-multiplexing a backscattered signal and a forward propagating signal within the fiber optic medium; and
mode de-multiplexing the backscattered signal and the forward propagating signal within the fiber optic medium.

19. The non-transitory computer-readable storage medium of claim 17, wherein the computer-readable program, when executed on a computer, is further configured to cause the computer to perform the step of filtering the spatial modes within the backscattered signal.

20. The non-transitory computer-readable storage medium of claim 19, wherein the computer-readable program, when executed on a computer, is further configured to cause the computer to perform the steps of:
receiving, using a first coherent receiver, the backscattered signal;
receiving, using a second coherent receiver, the forward propagating signal; and
applying multiple-input and multiple-output digital signal processing algorithms to separate different measurands within each of the backscattered signal and the forward propagating signal.

* * * * *